(12) United States Patent
Szychowski (10) Patent No.: US 9,509,140 B2
(45) Date of Patent: Nov. 29, 2016

(54) ELECTRONIC DEVICE FOR THE CONNECTION OF TWO OR MORE LOADS TO THE ALTERNATING ELECTRICAL NETWORK AND THE EXECUTED CONNECTION PROCEDURE

(71) Applicants: Exo S.A., Buenos Aires (AR); Julio Héctor Szychowski, Buenos Aires (AR)

(72) Inventor: Julio Héctor Szychowski, Buenos Aires (AR)

(*) Notice: Subject to any disclaimer, the term of this patent is extended or adjusted under 35 U.S.C. 154(b) by 582 days.

(21) Appl. No.: 14/014,233

(22) Filed: Aug. 29, 2013

(65) Prior Publication Data

US 2014/0070631 A1    Mar. 13, 2014

(30) Foreign Application Priority Data

Aug. 29, 2012  (AR) .............................. P120103197

(51) Int. Cl.

| | | |
|---|---|---|
| *H01H 35/00* | (2006.01) | |
| *H01H 83/00* | (2006.01) | |
| *H02H 3/00* | (2006.01) | |
| *H01H 47/00* | (2006.01) | |
| *H02J 3/00* | (2006.01) | |
| *H02J 3/14* | (2006.01) | |

(52) U.S. Cl.
CPC .. *H02J 3/00* (2013.01); *H02J 3/14* (2013.01); *H02J 2003/143* (2013.01); *Y02B 70/3225* (2013.01); *Y02B 70/3266* (2013.01); *Y04S 20/222* (2013.01); *Y04S 20/242* (2013.01); *Y10T 307/766* (2015.04); *Y10T 307/858* (2015.04)

(58) Field of Classification Search
CPC ....... H02J 3/14; Y02B 70/3225; H01H 9/56; Y10T 307/484; H02H 9/001; H02H 9/00; G01R 31/3624; G01R 31/00
USPC .......... 307/130, 116, 38, 41, 64; 361/166, 1, 361/139, 100, 195
See application file for complete search history.

(56) References Cited

U.S. PATENT DOCUMENTS

| | | | | |
|---|---|---|---|---|
| 4,626,698 | A * | 12/1986 | Harnden, Jr. ............ | H01H 9/56 307/35 |
| 5,384,490 | A * | 1/1995 | Swartz, Jr. ................ | H02J 3/14 307/38 |
| 5,541,490 | A * | 7/1996 | Sengupta ........... | G01R 31/3624 320/160 |
| 2012/0228962 | A1* | 9/2012 | Sharma .................. | H02H 9/001 307/113 |
| 2013/0057998 | A1* | 3/2013 | Li ........................... | H01H 9/56 361/187 |

* cited by examiner

*Primary Examiner* — Rexford Barnie
*Assistant Examiner* — Jagdeep Dhillon
(74) *Attorney, Agent, or Firm* — Levenfeld Pearlstein, LLC (57) ABSTRACT

Electronic device for the connection of two or more loads to the alternating electrical network and the executed connection procedure, allowing for the supply of such loads keeping under control inrush current value, as well as supplying the nominal current value during steady state. The device and its procedure comprise a clear solution especially designed for simultaneous charge of significant amount of electronic devices, whose charge is carried out by switching-type DC chargers. This situation is feasible for both single-phase networks of 110 VAC or 220 VAC nominal.

18 Claims, 10 Drawing Sheets

ELECTRONIC DEVICE FOR THE CONNECTION OF TWO OR MORE LOADS TO THE ALTERNATING ELECTRICAL NETWORK AND THE EXECUTED CONNECTION PROCEDURE

CROSS REFERENCE TO RELATED APPLICATIONS

This application claims priority to Argentina Patent Application Number P20120103197, filed on Aug. 29, 2012, the entire contents of which are incorporated herein for all purposes by this reference.

FIELD OF INVENTION

The invention comprises an electronic device for the connection of two or more loads to the alternating electrical network and the executed connection procedure.

This device has been carefully designed to satisfy a need for simultaneous connection of certain loads, particularly when it comes to loads with a transitional phase with a high inrush current.

BACKGROUND

Nowadays, technical procedures have widely used loads of equal or similar characteristics simultaneously. A very common example of this situation arises in study labs, classrooms or conference rooms having a considerable number of switching power supplies or chargers.

For instance, in the case of a massive application in study classrooms, where every student has a notebook, the simultaneous charge of such devices would be required. Taking into consideration that there may be as many as 40 students in the same class, 40 switching power supplies or DC chargers should be connected simultaneously when students leave school. With a 50 W average consumption for every source, we would get a 2,000 W consumption. With an alternating voltage supply of 220 VAC, it results in over 9 A of consumed current. While this value may not be high, the main problem arises when a multiple socket (a power strip), where all chargers are connected, is being plugged to the network. At this time, the inrush current highly exceeds nominal current.

Apart from the wear and tear impact and the useful life reduction of connection and wiring elements making up the power circuit, an additional effect may turn unfeasible the simultaneous connection. Quoting some values, the transitional phase of a switching DC charger may last around 300 ms. In the case of a single-phase power supply network rated 220 VAC, 50 Hz, protected with a thermo-magnetic switch of 20 A, Curve C, the instantaneous trip of such thermo-magnetic switch shall be between 5 and 10 times its nominal current value. Therefore, in the best-case scenario, when reaching 1=20 A×10=200 A, the switch shall open, to protect the installation. With an aggregate number of 40 DC chargers of 50 W each, a high inrush current would be obtained if they were all connected simultaneously, with a value even higher than 200 A. Therefore, the switch shall assume that is in presence of a "short-circuit" and shall open its poles, to protect the installation. The abovementioned situation has been detected, as mentioned, in classrooms. Clearly, the current state of technique does not contemplate these cases, as it did not deal with them. Therefore, at present, there are neither devices nor supplies that efficiently and comfortably solve this situation.

An instruction manual for the connection procedure may be considered but, besides the inconvenience, it should be taken into consideration that it shall be carried out by staff with a non-technical training, in many cases teachers/professors in areas completely separated from the technical field. Thus, no satisfactory results would be achieved. Moreover, the premature aging of connectors, cables, sockets, etc. has not been emphasized, but it should be considered.

Taking into consideration that switching chargers can keep constant their DC output voltage for a wide range of input voltages, in the case of 110 VAC supply situation, even with voltages lower than 100 VAC in many cases, for the same example above (40 sources of 50 W each), a nominal current consumption of 20 A would be obtained. At first sight, it may be inferred that the situation is not good either, in this case not because of inrush current issues, but because the steady state current shall be high. In the case of a circuit protected and calculated for nominal 20 A, 100% of consumption would be assigned to switching DC chargers only, with 0% available for other essential loads.

SUMMARY OF THE INVENTION

It is an object of the present invention to provide an electronic device for the connection of two or more loads to the alternating electrical network and executed connection procedure, capable of limiting the current peak to a tolerable range whenever two or more loads, in the form of switching DC chargers, are connected to the network, as well as keeping the same input nominal current, whether used in 200-240 VAC networks, as well as in 100-120 VAC networks.

It is an additional object of the present invention to provide an electronic device for the connection of two or more loads to the alternating electrical network and the executed connection procedure, capable of doing so in electrical security conditions that may be acceptable for the user and technically acceptable for the electrical installation.

Lastly, this invention aims to provide an electronic device for the connection of two or more loads to the alternating electrical network and the executed connection procedure in order to take advantage from solid state relays (SSR) with zero-crossing connection capabilities: the SSR turns on when the instantaneous AC voltage crosses zero after the input signal is activated.

DETAILED DESCRIPTION

Preferred Embodiments

Figure 1:
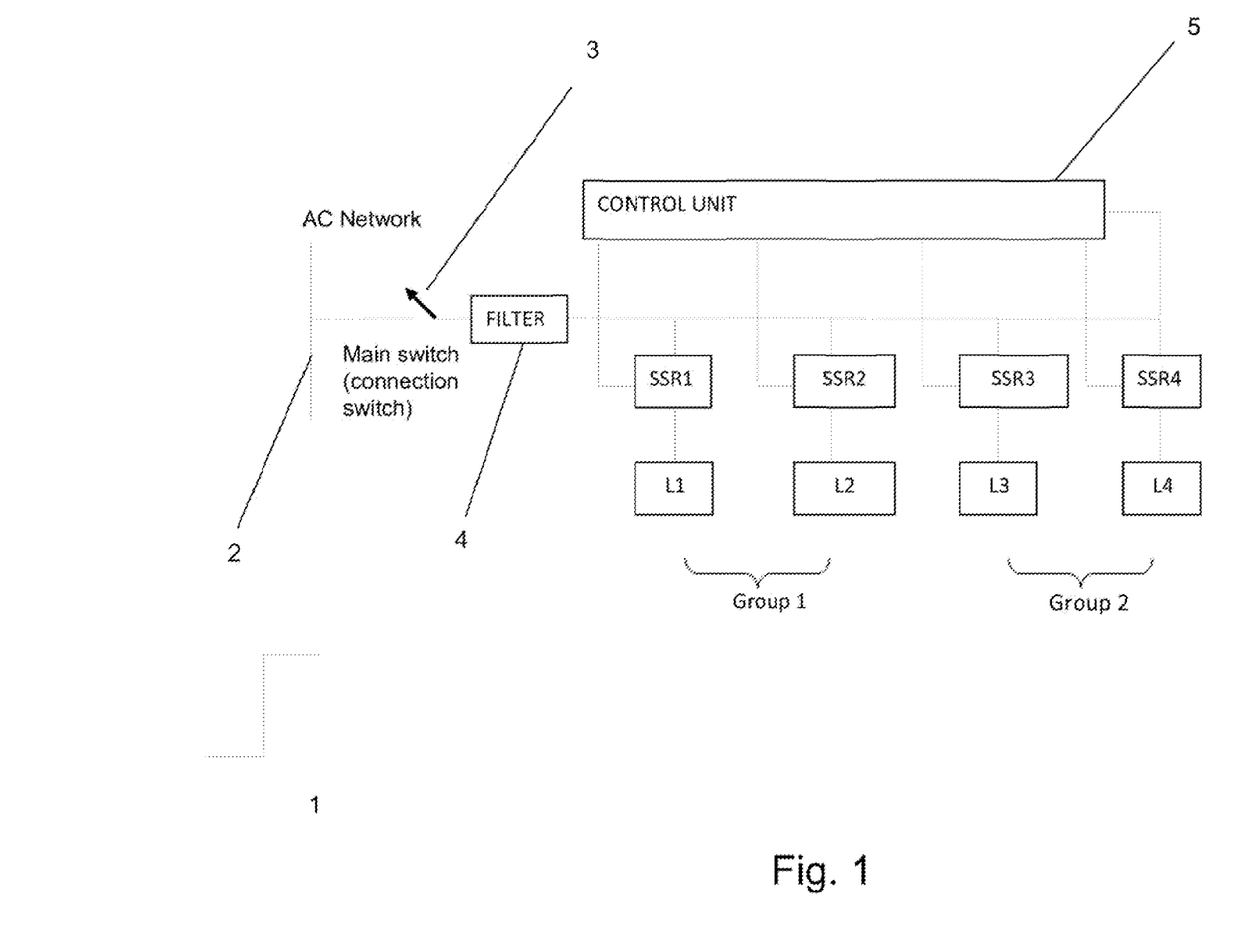
FIG. 1 shows a block diagram of an electronic device for the connection of two or more loads to the alternating electrical network of this invention.

FIG. 1 shows an electronic device for the connection of two or more loads to the alternating electrical network, referenced as 1.

Device number 1 executes a certain connection procedure, described below.

The different loads that the device connects/supplies are represented by a number n of loads, arranged from load number 1 to load number n, for the case of FIG. 1, as per references $L_1$, $L_2$, $L_3$ and $L_4$.

Loads $L_1$ to $L_4$ present low impedance value in the initial transitional phase taking place at the time of connection, resulting in a relatively high inrush current.

As mentioned above, each load $L_1$ to $L_4$ (Li in a generic case) also comprises more than one sub-load or individual device to be powered.

Electrical network 2 is preferably single-phase rated 110 VAC or 220 VAC nominal, with the possibility of bearing another rms (root mean square) value and/or three-phase characteristics. Actually, in practical cases, 200-240 VAC and 100-120 VAC networks are held, with the possibility of 50 Hz or 60 Hz frequency indistinctively.

Device 1 comprises an electrical network connection main switch 3 for electrical network 2 connected to a transient filter or snubber 4. A control unit 5 powered with voltage filtered by such snubber 4 is also considered. For connection purposes of each load, n solid-state relays (SSR) are included, in this application example $SSR_1$, $SSR_2$, $SSR_3$, and $SSR_4$, individually driven by control unit 5.

Moreover, it may be observed that each load $L_1$ to $L_4$ is unequivocally connected to the pertinent solid-state relay $SSR_1$ to $SSR_4$. It should be explained that SSR is term common for any knowledgeable person, as it means "Solid State Relay" in English.

A relevant and outstanding feature of electronic device 1 described herein is that it takes advantage from solid state relay (SSR) features, employing relays with zero-crossing connection capabilities: the SSR turns on when the instantaneous AC voltage crosses zero after the input signal is activated. This ensures minimum inrush current.

Figure 2:
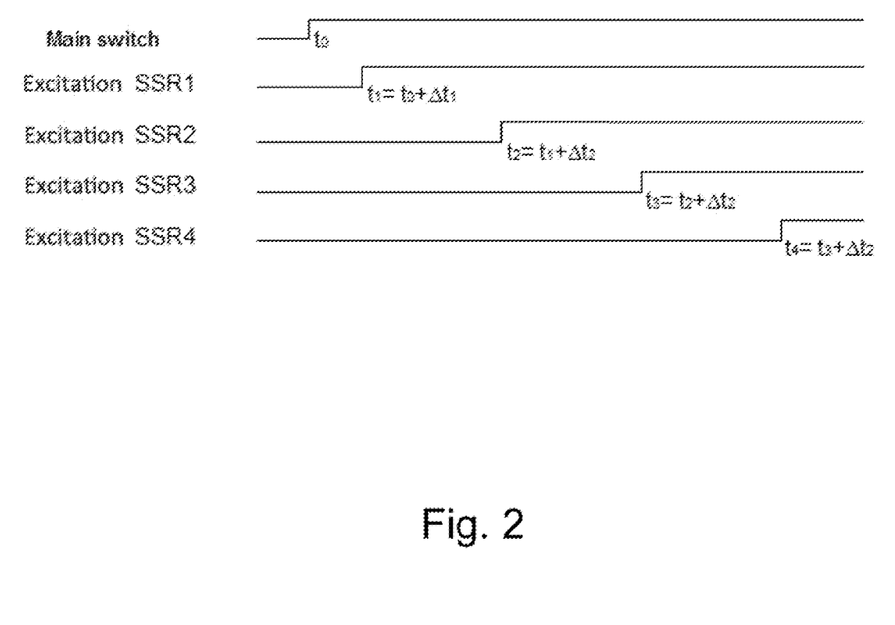
FIG. 2 shows a time diagram of excitation of solid state relays (SSR) for an application example containing four loads, for a single-phase alternate power network of 200-240 VAC. Each of these four loads may contain one or more sub-loads, or single loads, for example, switching-type DC chargers.

FIG. 2 shows a time diagram of solid state relays excitation for an application example comprised of 4 loads. In this case, we have single-phase alternate power network of 200-240VAC. The diagram shows connection instants taking as reference closure of switch 3.

Specific time intervals required for proper operation of the device are detailed below:

$t_0$: initial instant when connection switch is closed.

$\Delta t_1$: delay from initial instant to $SSR_1$ excitation. This delay aims to allow extinguishing of switch contact rebounds, in order to establish a continuous and clear connection thereof, before ignition of the first SSR. Therefore, contact sparkling is avoided, extending useful life of connection switch.

$\Delta t_2$: delay from previous SSR excitation to the following SSR excitation. With this delay, before the ignition of a new SSR, the over-current produced by the previous SSR ignition is vanished.

Figure 3:
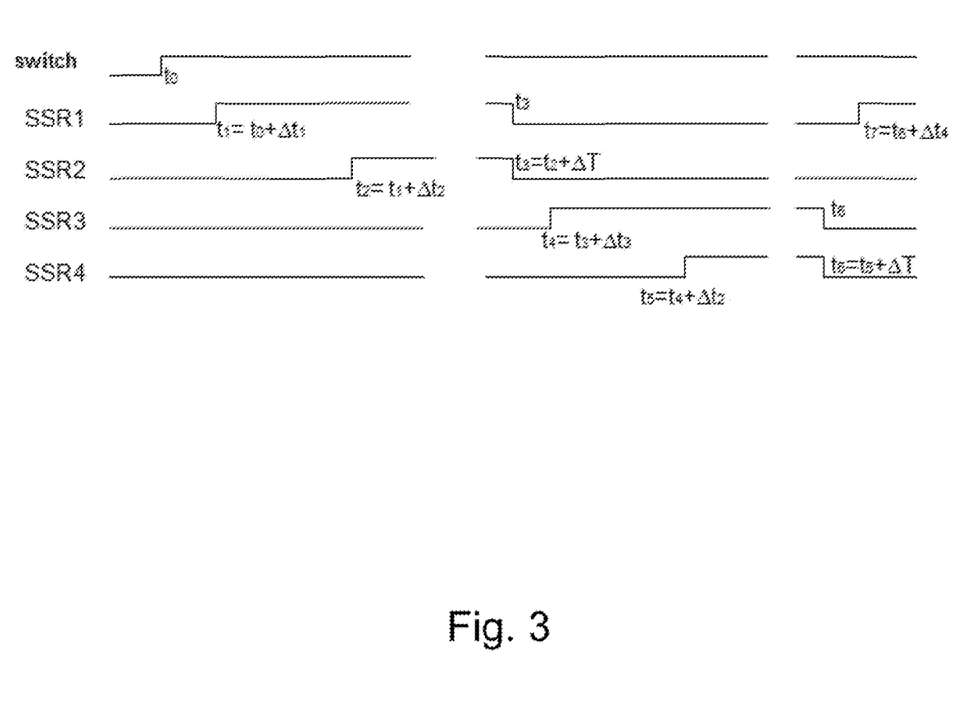
FIG. 3 shows a time diagram of excitation of solid state relays (SSR) for an application example containing four loads, for a single-phase alternate power network of 100-120 VAC, where loads and solid state relays are consequently divided into two groups.

Moreover, FIG. 3 may be understood as the operation of this invention for the excitation of four solid state relays $SSR_1$, $SSR_2$, $SSR_3$, and $SSR_4$, to connect four pertinent loads, to a single-phase alternate power network of 100-120 VAC. In this situation, not only the individual excitation of every solid state relay is being looked after, but also it divides them into groups (G1 and G2) in order to maintain feeding current of loads, controlled within admissible values of electrical installation.

In this case, pertinent times are also explained:

$\Delta T$: long interval compared with $\Delta ti$ short delays.

The G1 or G2 group, in which L has been subdivided, is active one at a time for a $\Delta T$ interval so that the same group is reactivated every $2\Delta T$ seconds. Thus, current taken from the network is only that of the active group and not the one that shall consume the whole load L.

$\Delta t_3$ (or $\Delta t_4$): delay from the end of excitation of the latest SSR of group 1 (or group 2) until the excitation of first SSR of group 2 (or group 1). This delay is necessary to ensure shutdown of all SSR of the previous active group before turning on the first SSR of the following group. This time delay shall exceed 10 ms.

ti: instant when the excitation of an SSR commences or ends.

It should be mentioned that, depending on the number of sub-sets, control unit 5 might be implemented with a dedicated microprocessor, or with integrated logic circuits and a few discrete components.

Figure 4:
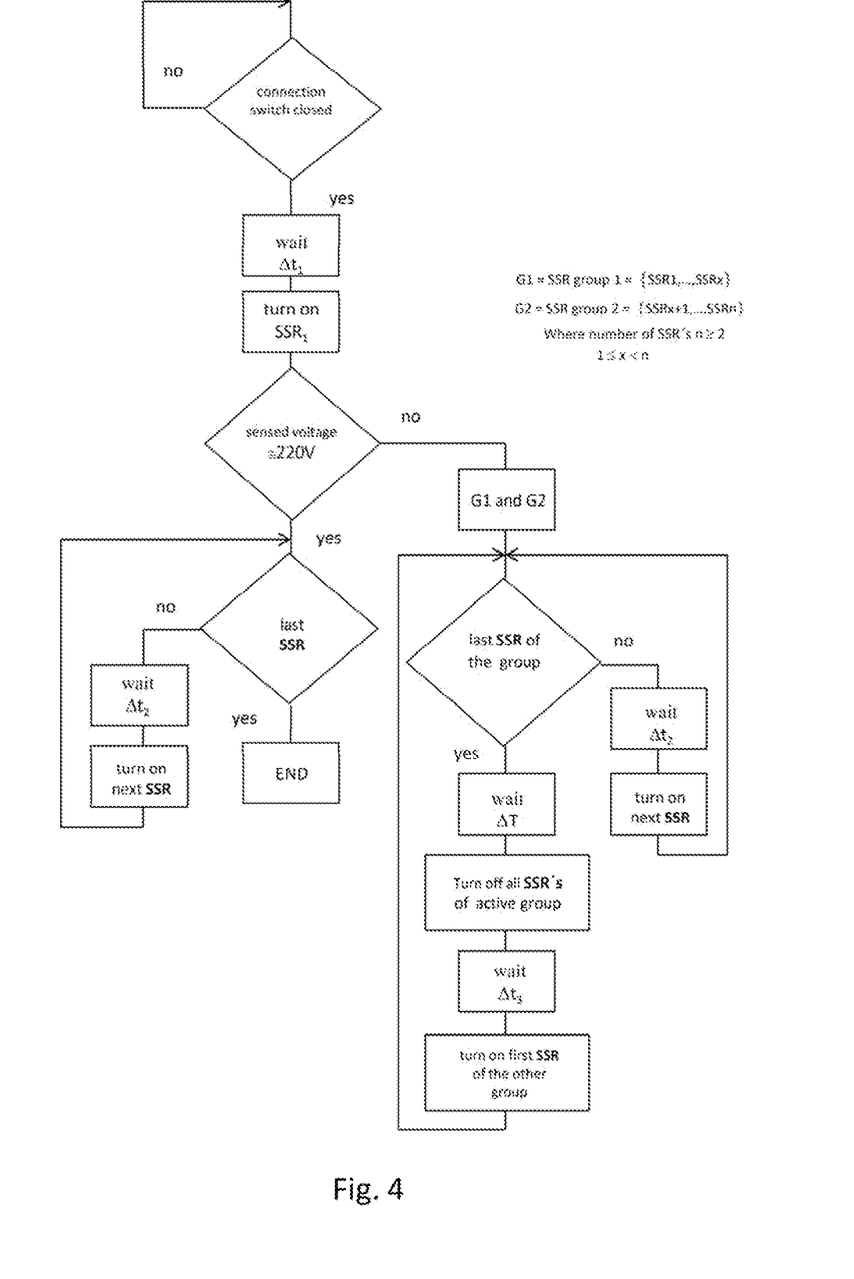
FIG. 4 shows a flow diagram of the procedure carried out by the device of this invention pursuant to method A.

FIG. 4 shows a flow diagram for device 1 with control unit 5 with a microprocessor. In particular, it is about a performance example A, or method A, where $\Delta t_4 = \Delta t_3$.

Generically, the device executes a procedure that activates (excites) and deactivates in function of time the different SSRi. This activation is individual, following a sequence, or in groups, being also in agreement with the result of verification of, at least, one predefined operation condition.

For the case of Method A, in FIG. 4, the procedure includes a first predefined operation condition based on "whether network voltage is similar or equal to 220 VAC" (this way it discriminates between a 110 VAC close to or equal voltage).

Following flow diagram of FIG. 4, it may be appreciated that the procedure executed contemplates the following stages:

a) Verify main switch (connection key) close position,
b) Once the switch has been closed, wait for some time $\Delta t1$,
c) Excite $SSR1$,
d) Verify whether sensed voltage is equal or close to 220 VAC.
d') If YES:
   e) Verify whether the latest SSR has been excited.
     e') If YES:
       f) End.
     e") if NO:
       g) Wait for $\Delta t2$,
       h) Excite the following SSR, i) Return to e).
d''') If NO:
  j) Separate SSRi in groups, G1 and G2, and assign the first working group (whether G1 or G2, which shall later be alternated by G2 and G1 respectively),
  k) Verify whether the latest SSR of the group has been excited:
    k') If YES:
      l) Wait for ΔT,
      m) Turn off all SSR of the group,
      n) Wait for Δt3,
      o) Excite first SSR of the other group,
      p) Return to k).
    k'') If NO:
      q) Wait for Δt2,
      r) Excite next SSR of the group,
      s) Return to k).

The procedure explained above may be improved for 110 VAC operation, allowing for the connection of new SSRs as those who have reached their ignition time are turned off. Thus, not all the SSRs of a group need to be turned off before starting to turn on a SSR of the other group, and therefore the transition is made gradually. The advantage is that network current is more stable.

This method may be extended to other cases where cycling is recommended, even when voltage reaches 220 VAC. This situation arises whenever total current load exceeds maximum capacity of installation.

Figure 6:
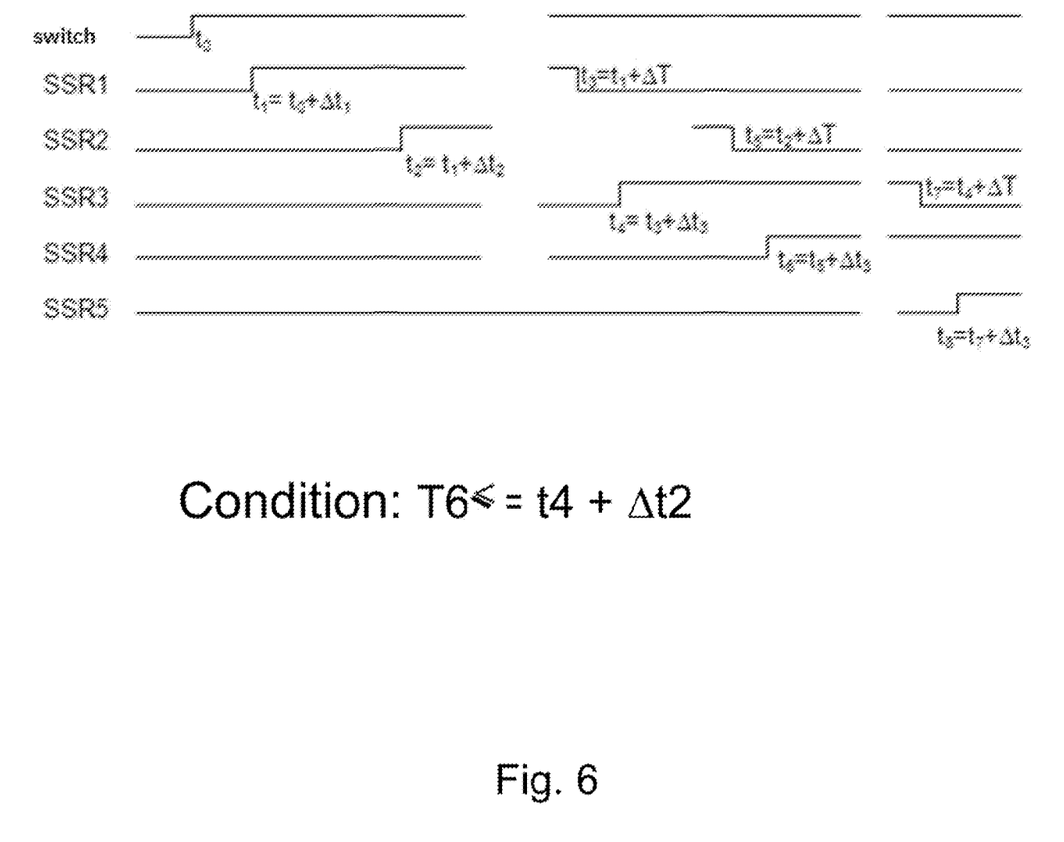
FIG. 6 shows a time diagram representing, as an example, a five loads case, where only two may be fed at the same time in order to prevent overload of maximum capacity of installation.

FIG. 6 shows a time diagram representing a case of five loads, where only two may be fed at the same time in order to prevent overload of maximum capacity of installation. In this case, like in the example of case A above, it is assumed that a $\Delta t_a$ interval is needed from the moment a SSR is de-excited until the next SSR is ignited. The duration of this interval shall be higher than half a cycle of the alternating voltage in order to ensure SSR shutdown.

It is also assumed that a $\Delta t_e$ interval is needed between two consecutive ignitions in order to allow for the vanishing of current transient caused by the previous ignition.

Figure 5:
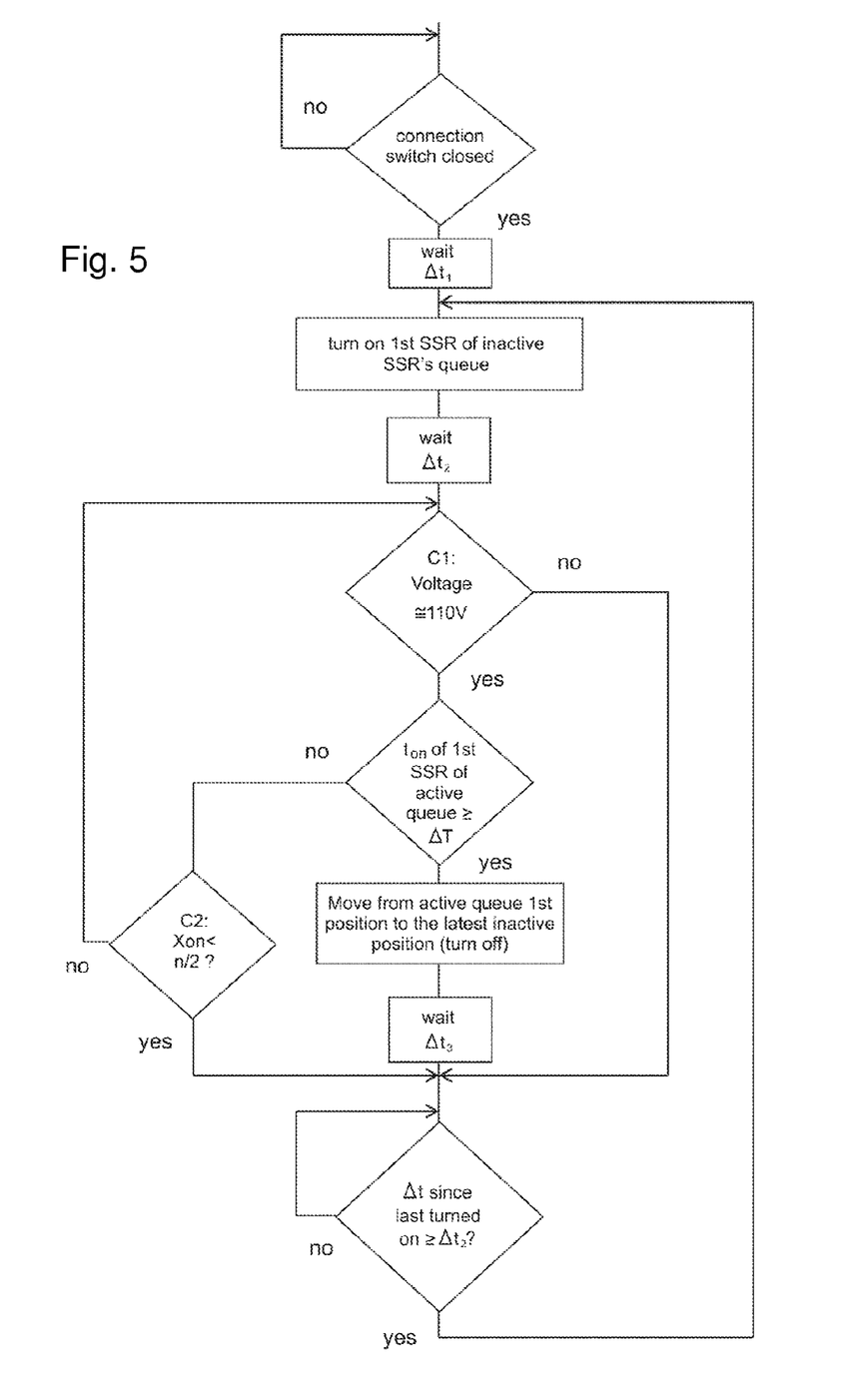
FIG. 5 shows a flow diagram of the procedure carried out by the device of this invention pursuant to method B.

FIG. 5 shows the flow diagram for alternate method B, or improved method, where a microprocessor is also used to put control unit 5 into practice. In this procedure, C1 and C2 are conditions decided externally, with the following meaning:

C1: need to cycle.

For example, for 110 VAC voltage, cycling shall be necessary. Possibly, even though the voltage was 220 VAC, if the total load exceeds the maximum allowed, cycling shall be necessary.

C2: limits the number of SSR that may be on simultaneously. In order to accomplish this, actual current may be measured and compared, for example: $I < I_{minimum}$?

Alternatively, counting the number of SSRs on (Xon): are there less than n/2 (or any other fraction) of SSRs on? (n=total number of SSRs).

The procedure executed with method B contemplates the following stages:

a) Verify main switch (connection key) close position,
b) Once the switch has been closed, wait for some time Δt1,
c) Excite the first SSR of the inactive solid state relay queue,
d) Wait for Δt2,
e) Verify whether sensed voltage is equal or close to 110 VAC.
  e') If YES:
    f) Verify whether ignition time of the first SSR of active SSR queue is higher or equal to ΔT.
      f') If YES:
        g) Turn off the first SSR of the active SSR queue and move it to the end of inactive SSR queue,
        h) Wait for Δt3,
        i) Go to step m).
      f'') If NO:
        j) Verify whether the number of SSR on is lower than n/2,
          j') If YES:
            k) Go to step m).
          j'') If NO:
            l) Go to step e).
  e'') If NO:
    m) Verify whether Δt elapsed from the latest ignition is higher than Δt2.
      m') If YES:
        n) Go to step c).
      m'') If NO:
        o) Go to step m).

In summary, in this case the SSRs have been divided into two queues or rows: an active SSR queue where the first element is the SSR that has been on for longer and the last is the one that has just been turned on. Another queue shall contain inactive SSRs, where the first element is the SSR that has been off for longer and the last is the one that has just been turned off. Initially, before $t_0$ instant, all SSRs shall be within the inactive SSRs queue, in a preset order.

Practical execution of the procedure outlined above is supplemented with security devices whose function should not be executed by software, in order to answer in fast way to different special situations. For example, in the case of temporary loss of voltage, or in case of short-circuits, etc.

The n loads connected by the n solid state relays may be of the switching-type DC chargers. In fact, this is when electronic device 1 is better applied. More precisely, they might also be switching chargers of the type employed in the individual charge of portable computers. We insist that there may be more than one charger for every SSR. In fact, in the cart designed for simultaneous charge of notebooks, making use of the present invention, there are 10 or more chargers for every SSR.

Figure 7:
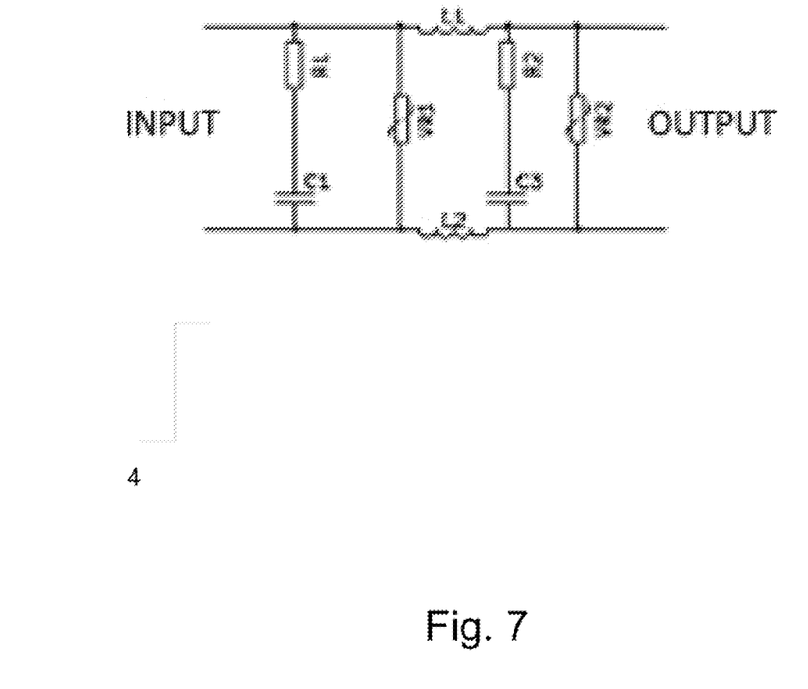
FIG. 7 shows an example of a transient filter, used by the electronic device for the connection of two or more loads to the alternating electrical network of this invention.

FIG. 7 shows transient filter 4. This transient filter, or snubber, limits dv/dt and di/dt high values, as well as instantaneous voltage peaks and valleys. Additionally, because of its features, it also aims to extend useful life of main switch or connection switch 3.

It may be observed that it is made up of a combination of coils and resistive-capacitive branches and varistors.

Figure 8:
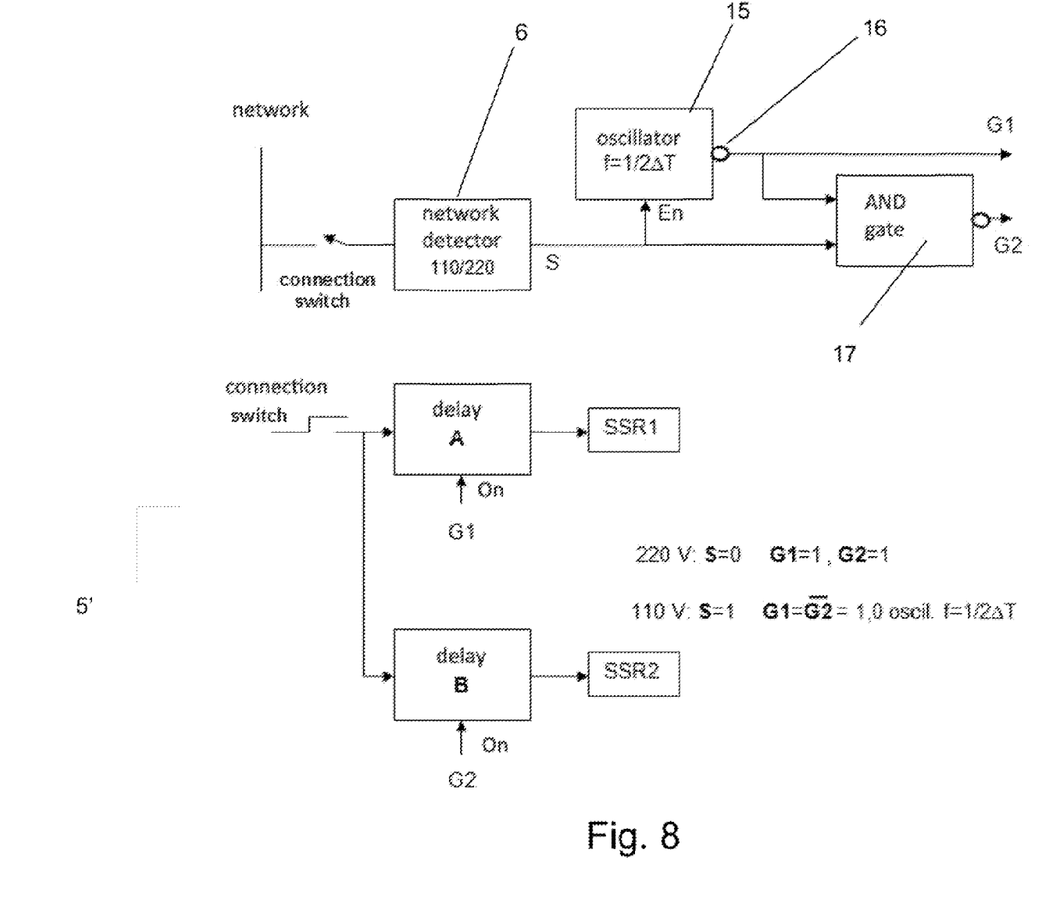
FIG. 8 shows a particular example of the application of a non-micro-processed type control unit, implemented with simple components.

FIG. 8 may be considered as an example of non microprocessed control unit 5, being applicable for the simplest case of only two subsets. Control unit includes a circuit detecting the value of alternating electrical voltage.

Then, some comments are made related thereto and are explained its operation:

En: Enabling input, the function is enabled with En=1. With En=0, the output is 0.

AND gate and oscillator have inverted outputs.

Operation method for delay blocks is also important: when "En" enabling input goes to level 1, block output goes to level 1 and excites SSR only after the pertinent delay. However, when "En" input goes to level 0, block output goes immediately to 0.

The oscillator behaves similarly to delay blocks: denied output goes to state 0 only for ΔT after enabling "En" has gone to level 1, and later frequency oscillation f=½ΔT alternates between states 0 and 1.

In order to simplify implementation, in this case:

$\Delta t_4$=delay A $\Delta t_3$=delay B
$\Delta t_2$=delay B–delay A
T>>$\Delta ti$
($\Delta t_4$, $\Delta t_3$, $\Delta t_2$: see time diagram on FIG. 3).

Initial delay after connection switch closure until $SSR_1$ excitation, $\Delta t_1$, is also covered by delay A.

For example, practical values for these intervals are the following:
delay A≈20 ms
delay B≈200 ms
T≈3 min This example of non micro-processed control unit applies to a very simple limited case where both flow diagrams are valid, whether method A or method B explained above (FIGS. 4 and 5).

Figure 9:
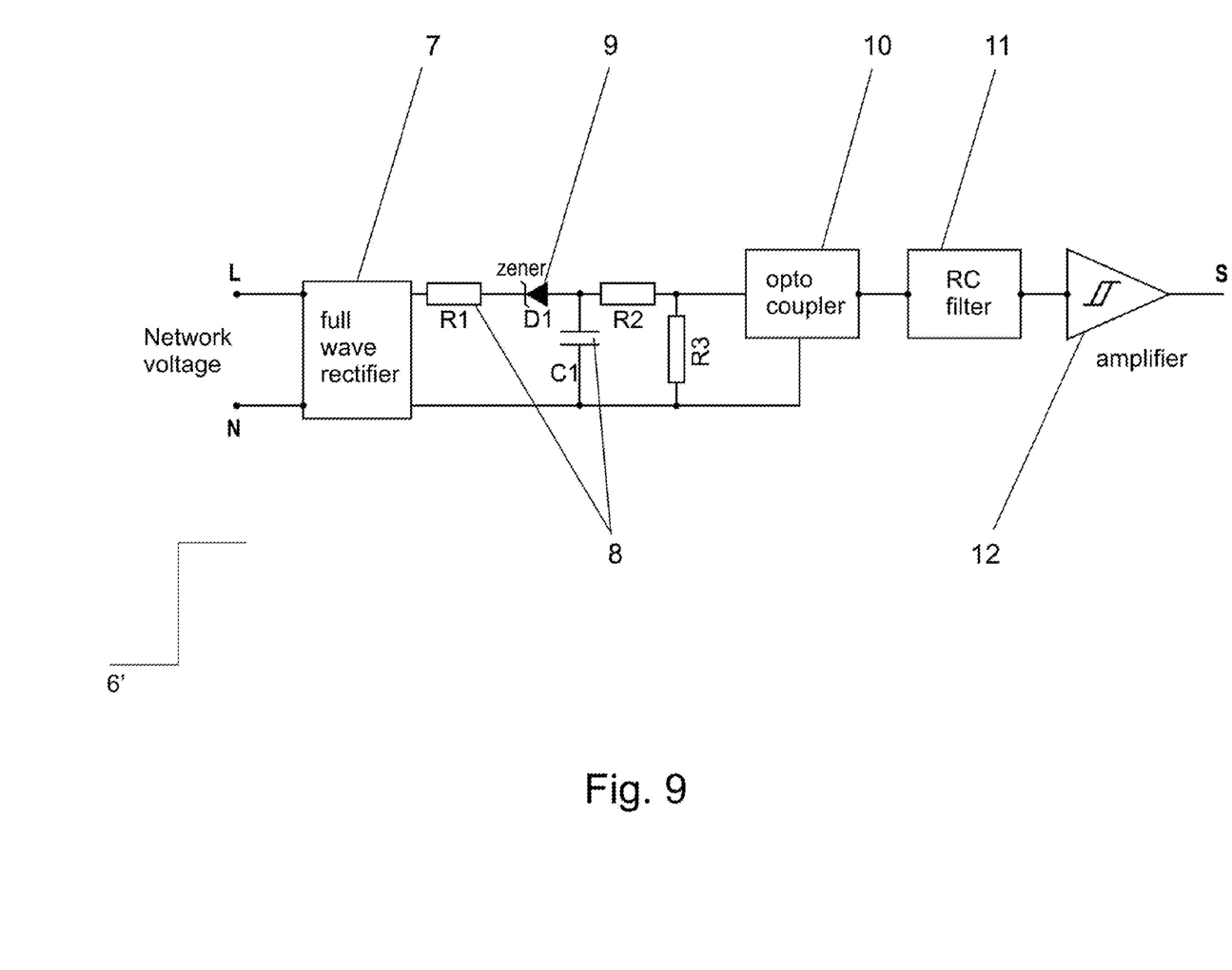
FIG. 9 shows a first example of application of a circuit sensing the value of alternating network voltage, included in the control unit.

FIG. 9 shows the first example of application of circuit 6 to detect the value of alternating network voltage, imbedded in the control unit. This detecting circuit 6' includes the following modules:
 a) Full wave rectifier of network alternating voltage 7,
 b) Voltage filter with R1-C1, indicated with reference 8,
 c) Comparison with Reference Voltage, represented in this case by a Zener diode 9,
 d) Galvanic isolation with opto-coupler 10,
 e) RC filter for DC voltage 11, located after the opto-coupler,
 f) Amplifier with hysteresis 12.

Figure 10:
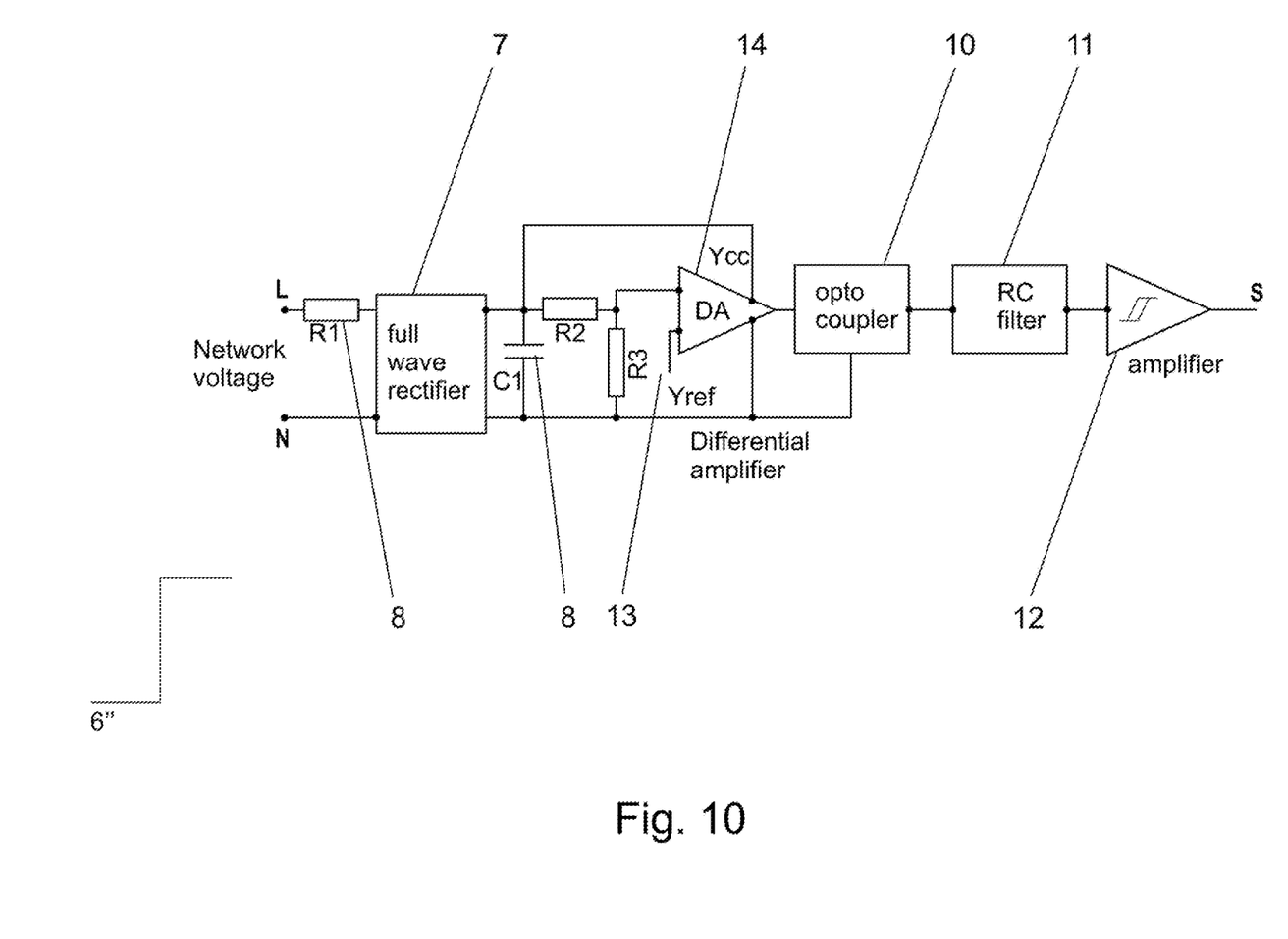
FIG. 10 shows a second example of application of a circuit sensing the value of alternating network voltage, included in the control unit.

Moreover, a second example 6" of application of a circuit to detect the value of alternating network voltage, included in control unit 5, is shown in FIG. 10. In this case, the main difference with the first example is that the comparison with the reference voltage is represented by a terminal with external reference voltage 13 as reference signal for a differential amplifier 14.

For more complex applications where each group must be divided in several loads, or whenever evolution is contemplated allowing for programming of the electronic device in this invention, the application may be feasible by the modification of software of micro-processed control unit 5.

In order to explain statements related to waiting times $\Delta t_1$ y $\Delta t_2$, it is valid to indicate that these may be values ranging between 1 and 1000 ms. Any modification shall be made pursuant to the particular requirement of the application, without implying a change in concept of the statements made related to this invention.

Similarly, and taking into consideration that $\Delta T$ is a time interval considered to achieve operation of power source and battery charge of a portable computer, it may be adequate that $\Delta T$ be in a range between few minutes and several hours. Naturally, some applications may require time intervals falling outside this range.

To sum up, it may be mentioned that, because of the foregoing, all these variations and/or modifications, as well any other variation and/or modification that may naturally be put into practice, are included in the concept of the invention herein.

What is claimed is:

1. An electronic device for connection of two or more loads to an alternating current electrical network, the electronic device comprising:
   an electrical network connection main switch connected to a transient filter;
   a control unit powered with current filtered by the transient filter; and
   a plurality of solid state relays (SSR), each SSR of the plurality of SSRs individually controlled by the control unit, each SSR of the plurality of SSRs connected to a respective load,
   wherein the control unit activates and deactivates different SSRs according to time, this activation is carried out individually following a sequence or in groups, and also being in accordance with the result of verification of, at least one external predefined condition,
   wherein the control unit includes a circuit that detects alternate network voltage values,
   wherein the circuit that detects voltage value comprises:
      a full wave rectifier of network alternating voltage;
      a RC filter of rectified voltage;
      a comparison module with reference voltage being external reference or including a Zener diode;
      a galvanic isolation opto-coupler;
      a RC filter with continuous voltage, located after the opto-coupler; and
      an amplifier with hysteresis.

2. The electronic device for the connection of two or more loads to the alternating electrical network of claim 1, wherein the at least one external predefined condition includes a first external predefined condition, the first external predefined condition establishing a need of continuous repetitive cycling the loads based on network voltage, either 220 Vac or 110 Vac.

3. The electronic device for the connection of two or more loads to the alternating electrical network of claim 2, wherein the at least one external predefined condition includes a second external predefined condition, the second external predefined condition limiting the number of SSR that may be on simultaneously or verifying if the current demanded of the network is less or equal than a certain predetermined value.

4. The electronic device for the connection of two or more loads to the alternating electrical network of claim 2, wherein the control unit is configured to:

verify main switch close position,
once the switch has been closed, wait for a first time period $\Delta t1$: delay from initial instant to SSR1 excitation,
turn on a first SSR,
verify whether sensed voltage is equal or close to 220 VAC,
   if the sensed voltage is equal or close to 220 VAC:
      verify whether the latest SSR has been turned on,
         if the latest SSR has not been turned on, then:
            wait for a second time period $\Delta t2$: delay from previous SSR excitation to the following SSR excitation, and
            turn on the following SSR,
            verify whether the latest SSR has been turned on,
         if the latest SSR has been turned on, then:
            end of procedure.
   if the sensed voltage is not equal or close to 220 VAC:
      separate the SSRs into a first working group and a second working group and assign the first working group,
         verify whether the latest SSR of the group has been turned on,
            if the latest SSR of the group has been turned on, then:
               wait for $\Delta T$,
               turn off all SSR of the group,
               wait for third time period $\Delta t3$, and
               turn on first SSR of the other group,
               verify whether the latest SSR of the group has been turned on,
            if the latest SSR of the group has not been turned on, then:
               wait for $\Delta t2$, and
               turn on next SSR of the group,
               verify whether the latest SSR of the group has been turned on.

5. The electronic device for the connection of two or more loads to the alternating electrical network of claim 3, wherein the control unit is configured to:

--- verify main switch close position,
once the switch has been closed, wait for a first time period Δt1,
turn on the first SSR of the inactive solid state relay queue,
wait for a second time period Δt2,
verify whether sensed voltage is equal or close to 110 VAC,
if the sensed voltage is equal or close to 110 VAC, then:
   verify whether ignition time of the first SSR of active SSR queue is higher
   or equal to ΔT,
   if yes, then:
     turn off the first SSR of the active SSR queue and move it to the end of inactive SSR queue,
       wait for a third time period Δt3, and
       verify whether Δt elapsed from the latest ignition is higher than Δt2,
       if no, then:
          verify whether the number of SSR on is lower than half of the total number of SSR,
             if yes, then:
               verify whether Δt elapsed from the latest ignition is higher than Δt2,
               if no, then:
                  verify whether sensed voltage is equal to or close to 110 VAC,
if the sensed voltage is not equal or close to 110 VAC, then:
   verify whether Δt elapsed from the latest ignition is higher than Δt2,
   if yes, then:
     turn on the first SSR of the inactive solid state relay queue,
   if no, then:
     verify whether Δt elapsed from the latest ignition is higher than Δt2.

---

6. The electronic device for the connection of two or more loads to the alternating electrical network of claim 1, wherein SSRs are of the type with zero-crossing connection.

7. The electronic device for the connection of two or more loads to the alternating electrical network of claim 1, wherein the loads are of the switching-type DC chargers.

8. The electronic device for the connection of two or more loads to the alternating electrical network of claim 7, wherein the switching-type chargers are the type employed for individual charge of portable computers.

9. The electronic device for the connection of two or more loads to the alternating electrical network of claim 1, wherein the transient filter limits dv/dt and di/dt high values, as well as peaks and voltage valleys, wherein the transient filter is made up of a combination of coils and resistive-capacitive branches, and resistive branches of varistors.

10. The electronic device for the connection of two or more loads to the alternating electrical network of claim 1, wherein in case the circuit detects alternating voltage value 110 VAC, and SSRs are divided in a first group G1 of relays and a second group G2 of relays, the control unit also includes a frequency oscillator $f=\frac{1}{2}\Delta T$ whose enable input is commanded by a logic output of the voltage detecting circuit, while a denied output of such frequency oscillator enables/disables excitation of first group of relays, and with the inclusion of an AND type gate, excitation for second group of relays is coincidentally disabled/enabled.

11. The electronic device for the connection of two or more loads to the alternating electrical network of claim 1, wherein the control unit is implemented as a dedicated microprocessor or with integrated logic circuits and one or more discrete components depending on a number of subsets.

12. The electronic device for the connection of two or more loads to the alternating electrical network of claim 4, wherein the first and second time periods Δt1 and Δt2 have values ranging between 1 and 1000 ms, wherein Δt1 is the delay from initial instant to SSR1 excitation, and Δt2 is the delay from previous SSR excitation to the following SSR excitation.

13. The electronic device for the connection of two or more loads to the alternating electrical network of claim 5, wherein ΔT is an adequate interval ranging between 1 min and 5 hours, wherein ΔT is a long interval compared with Δti short delays, wherein the G1 or G2 group, in which the load L has been subdivided, is active one at a time for a ΔT interval so that same group is reactivated every 2ΔT seconds, thus, current taken from the network is only that of the active group and not the one that shall consume the whole load L.

14. The electronic device for the connection of two or more loads to the alternating electrical network according to claim 5, wherein the third time period Δt3 has a value higher than 10 ms, wherein Δt3 is the delay from the end of excitation of the latest SSR of group 1 until the excitation of the first SSR of group 2, wherein this delay allows for shutdown of all SSR of the previous active group before turning on the first SSR of the following group.

15. The electronic device for the connection of two or more loads to the alternating electrical network of claim 5, wherein the first and second time periods Δt1 and Δt2 have values ranging between 1 and 1000 ms, wherein Δt1 is the delay from initial instant to SSR1 excitation, and Δt2 is the delay from previous SSR excitation to the following SSR excitation.

16. The electronic device for the connection of two or more loads to the alternating electrical network of claim 5, wherein ΔT is an adequate interval ranging between 1 min and 5 hours.

17. The electronic device for the connection of two or more loads to the alternating electrical network according to claim 5, wherein the third time period Δt3 has a value higher than 10 ms.

18. An electronic device for connection of two or more loads to an alternating current electrical network, the electronic device comprising:
   an electrical network connection main switch connected to a transient filter;
   a control unit powered with current filtered by the transient filter; and
   a plurality of solid state relays (SSR), each SSR of the plurality of SSRs individually controlled by the control unit, each SSR of the plurality of SSRs connected to a respective load,
   wherein the control unit activates (excites) and deactivates different SSRs according to time, this activation is carried out individually following a sequence or in groups, and also being in accordance with the result of verification of, at least one external predefined condition,
   wherein the control unit includes a circuit that detects alternate network voltage values, and
   wherein in case the circuit detects alternating voltage value 110 VAC, and SSRs are divided in a first group G1 of relays and a second group G2 of relays, the control unit also includes a frequency oscillator $f=\frac{1}{2}\Delta T$ whose enable input is commanded by a logic output of the voltage detecting circuit, while a denied output of such frequency oscillator enables/disables excitation of first group of relays, and with the inclusion of an AND type gate, excitation for second group of relays is coincidentally disabled/enabled.

* * * * *